United States Patent
Wark et al.

(10) Patent No.: US 9,924,001 B2
(45) Date of Patent: Mar. 20, 2018

(54) METHOD OF SELECTIVE NETWORK BUFFERING IN CHECKPOINT SYSTEMS

(71) Applicants: Stephen J Wark, Shrewsbury, MA (US); Srinivasu Chinta, Nashue, NH (US); Paul A Leveille, Grafton, MA (US); Leslie R Sibley, Hudson, NH (US)

(72) Inventors: Stephen J Wark, Shrewsbury, MA (US); Srinivasu Chinta, Nashue, NH (US); Paul A Leveille, Grafton, MA (US); Leslie R Sibley, Hudson, NH (US)

(73) Assignee: Stratus Technologies, Inc., Maryland, MA (US)

( * ) Notice: Subject to any disclaimer, the term of this patent is extended or adjusted under 35 U.S.C. 154(b) by 184 days.

(21) Appl. No.: 15/161,928

(22) Filed: May 23, 2016

(65) Prior Publication Data
US 2016/0373560 A1    Dec. 22, 2016

Related U.S. Application Data

(60) Provisional application No. 62/182,138, filed on Jun. 19, 2015.

(51) Int. Cl.
*H04L 29/06*    (2006.01)
*G06F 9/455*    (2018.01)
(Continued)

(52) U.S. Cl.
CPC .......... *H04L 69/22* (2013.01); *G06F 9/45558* (2013.01); *G06F 11/2005* (2013.01);
(Continued)

(58) Field of Classification Search
CPC ......... H04L 67/10; H04L 67/32; H04L 69/22; H04L 69/40; G06F 9/45558; G06F 11/2005
See application file for complete search history.

(56) References Cited

U.S. PATENT DOCUMENTS

2007/0174484 A1* 7/2007 Lussier ............... G06F 11/2097
                                                        709/238
2012/0266018 A1* 10/2012 Tanaka ................ G06F 11/2097
                                                        714/19
(Continued)

FOREIGN PATENT DOCUMENTS

EP         0747817 A2 *  12/1996    .......... G06F 11/1482

*Primary Examiner* — Benjamin H Elliott, IV
(74) *Attorney, Agent, or Firm* — Robert Schuler

(57) ABSTRACT

A method of allowing egress network frames to bypass the buffer requirement of a checkpoint system. In one embodiment, the method includes the steps of examining a frame, or its attributes, to determine if it is a "candidate frame" and if the frame is a candidate frame, allowing it to be released to the external network without an intervening checkpoint. In another embodiment, the candidate frame is one of a group comprising: any frame targeting a designated network interface; any frame of a designated protocol type; any frame sourced or destined from/to a designated address. In still another embodiment, the method includes the designation of scheduling follow-up checkpoints according to frame disposition to limit or reduce the effects of a fail-over (roll-back) disturbance.

15 Claims, 3 Drawing Sheets

Figure 1:
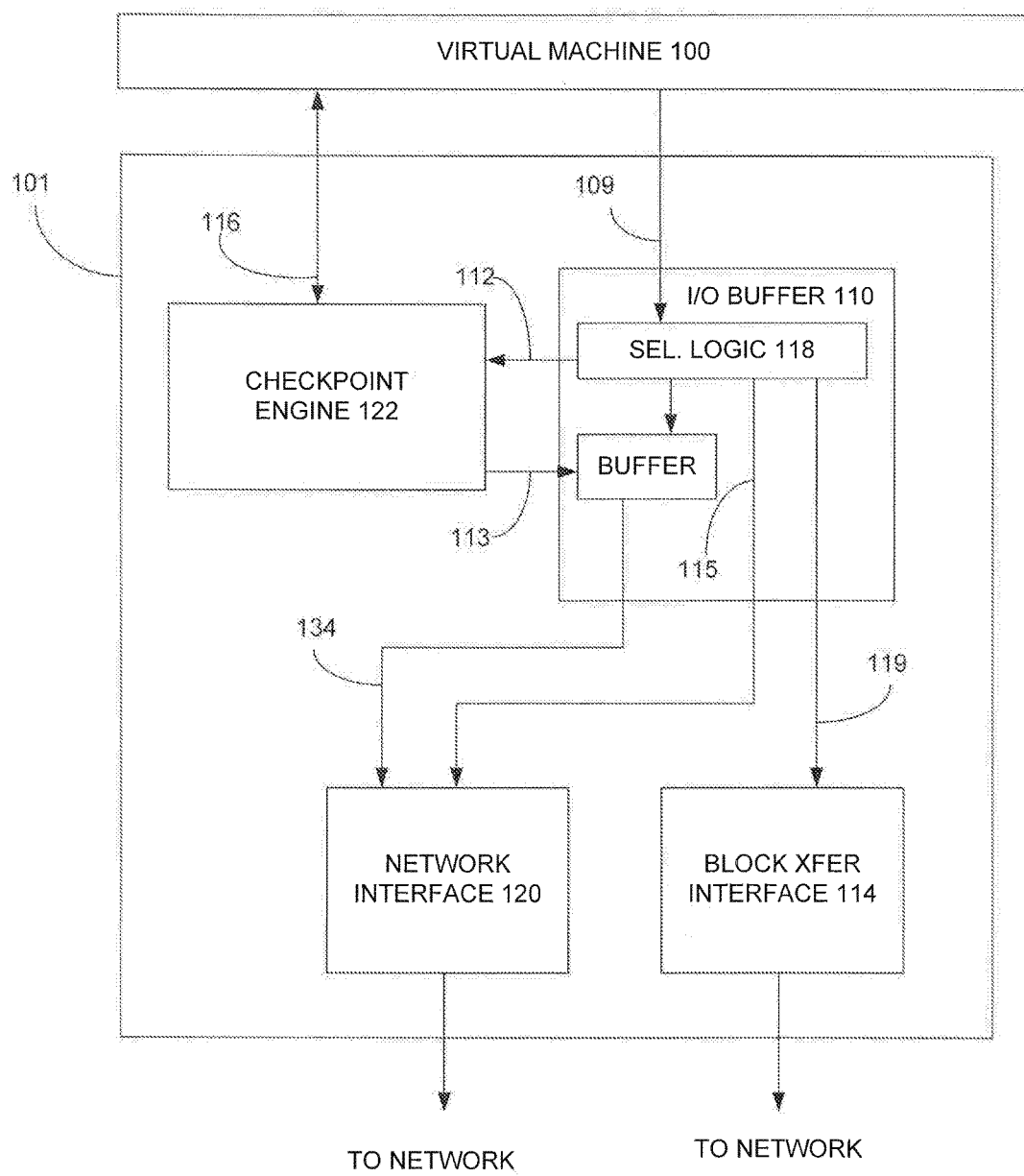

(51) Int. Cl.
*G06F 11/20* (2006.01)
*H04L 29/08* (2006.01)
*H04L 29/14* (2006.01)

(52) U.S. Cl.
CPC .............. *H04L 67/32* (2013.01); *H04L 69/40* (2013.01); *G06F 2009/45595* (2013.01); *G06F 2201/85* (2013.01); *H04L 67/10* (2013.01)

(56) References Cited

U.S. PATENT DOCUMENTS

| | | | |
|---|---|---|---|
| 2015/0081632 A1* | 3/2015 | Jacobs | G06F 17/30584 |
| | | | 707/625 |
| 2015/0149999 A1* | 5/2015 | Ramanathan | G06F 9/4856 |
| | | | 718/1 |
| 2016/0057052 A1* | 2/2016 | Zhang | H04L 45/28 |
| | | | 709/239 |
| 2016/0373560 A1* | 12/2016 | Wark | H04L 69/22 |

* cited by examiner

METHOD OF SELECTIVE NETWORK BUFFERING IN CHECKPOINT SYSTEMS

1. FIELD OF THE INVENTION

The invention relates generally to the field of fault tolerant computing and more specifically to checkpointing, networking and virtualization systems.

2. BACKGROUND

There are a variety of ways to achieve fault tolerant computing. Specifically hardware and software are typically used either alone or together. As an example, it is possible to connect two (or more) computers, such that one computer, the active computer or host, actively makes calculations while the other computer (or computers) is idle or on standby in case the active computer or hardware or software component thereon experiences some type of failure. In these systems the information about the state of the active computer must be saved periodically to the standby computer so that the standby computer can substantially take over at the point in the calculations where active computer experienced a failure. This example can be extended to the modern day practice of using a virtualized environment as part of a cloud or other computing system.

Virtualization is used in many fields to reduce the number of servers or other resources needed for a particular project or organization. Present day virtual machine computer systems utilize virtual machines (VM) operating as guests within a physical host computer. Each virtual machine includes its own virtual operating system and operates under the control of a managing operating system or hypervisor executing on the host physical machine. Each virtual machine executes one or more applications and accesses physical data storage and computer networks as required by the applications. In addition, each virtual machine may in turn act as the host computer system for another virtual machine.

Multiple virtual machines may be configured as a group to execute one or more of the same programs. Typically, one virtual machine in the group is the primary or active virtual machine and the remaining virtual machines are the secondary or standby virtual machines. If something goes wrong with the primary virtual machine, one of the secondary virtual machines can take over and assume its role in the fault tolerant computing system. This redundancy allows the group of virtual machines to operate as a fault tolerant computing system. The primary virtual machine executes applications, receives and sends network data, and reads and writes to data storage while performing automated or user initiated tasks or interactions. The secondary virtual machines have the same capabilities as the primary virtual machine, but do not take over the relevant tasks and activities until the primary virtual machine fails or is affected by an error.

For such a collection of virtual machines to function as a fault tolerant system, the operating state, memory and data storage contents of a secondary virtual machine should be equivalent to the operating state, memory and data storage contents of the primary virtual machine. If this condition is met, the secondary virtual machine may take over for the primary virtual machine without a loss of any data. To assure that the state of the secondary machine and its memory is equivalent to the state of the primary machine and its memory, it is necessary for the primary virtual machine periodically to transfer its state and memory contents to the secondary virtual machine. It is also necessary to coordinate the release of primary virtual machine egress network traffic with this periodic update of the secondary.

The periodic exchange of data to maintain synchrony between the states of the virtual machines is termed checkpointing. A checkpoint cycle is executed involving steps to identify, acquire, transfer, acknowledge, and commit. These cycles repeat with each one defining a potential starting point for the secondary virtual machine, in the event of a failure of the primary virtual machine.

In the event of a primary VM failure, the secondary VM is 'rolled back' to the most recently committed checkpoint and all pending (buffered) network egress frames from the failed primary are discarded. This allows the secondary to safely roll back and restart its processing without creating conflicting results to network clients. Any new network egress traffic is again buffered until the next checkpoint cycle 'commit' allows them to be released.

The buffering of egress network traffic is thus an integral part of a checkpointing system. Unfortunately, this buffering adds substantial latency which can only be reduced by increasing the rate of checkpointing, which in turn increases system load. Even at the highest checkpointing rate possible, though, network latency continues to be substantially higher than with a non-checkpointing system due to the fundamental steps of checkpoint cycle processing.

A need therefore exists for ways to selectively eliminate this buffering-induced latency and corresponding checkpoint cycle overhead for applications capable of correctly handling a roll back.

3. BRIEF DESCRIPTION OF THE DRAWINGS

Figures 2A, 2B:
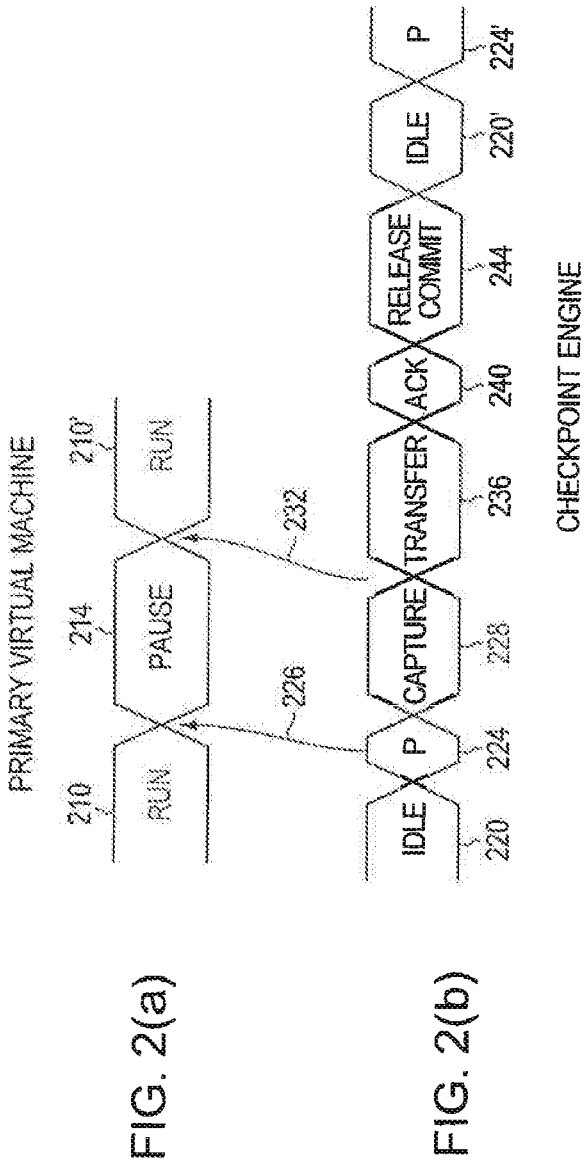
Figures 3A, 3B:
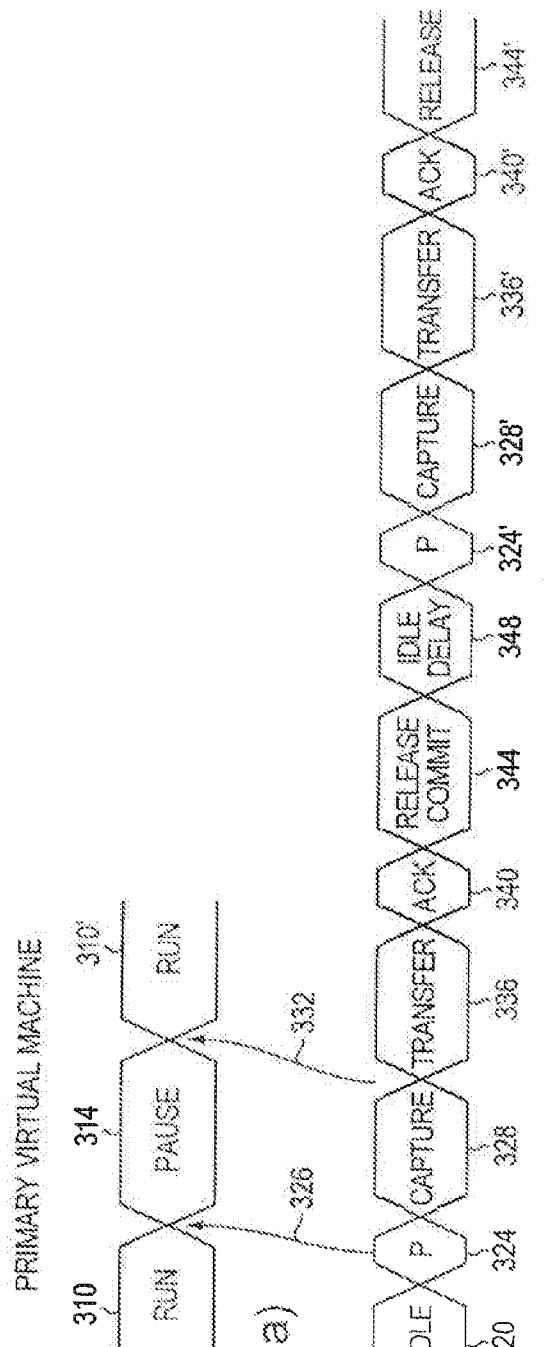

The present invention can be best understood by reading the specification with reference to the following figures, in which:

FIG. 1 is a block diagram of an embodiment of a checkpointing engine in a virtual machine constructed in accordance with the invention;

FIGS. 2(a) and (b) are timing diagrams known to the prior art for an embodiment of a virtual machine and a checkpointing engine, respectively; and FIGS. 3(a) and (b) are timing diagrams for an embodiment of a virtual machine and a checkpointing engine, respectively, constructed in accordance with the invention.

3. DETAILED DESCRIPTION

Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In one aspect, the invention relates to a method for selectively allowing egress network frames to bypass the buffering requirement of a checkpoint computer system. In one embodiment, the method includes the steps of examining a frame to determine if it is a candidate frame, and if the frame is a candidate frame, allowing it to bypass the egress buffer and be delivered immediately to the network. In another embodiment, a frame is identified as a candidate frame by its membership in a group comprising any frame originating from or destined to a designated set of TCP or UDP port numbers. In another embodiment, candidacy is determined by a source or destination network address. In another embodiment, a frame is identified as a candidate frame by its association with a network interface. In still another embodiment, the candidate frame delivery to the network is followed by a delayed checkpoint.

In another aspect, the invention allows egress network frames to bypass the buffering requirement of a checkpoint computer system. In one embodiment, a failure of the primary VM followed by the roll-back and resumption of the secondary VM purposefully allows the secondary to retransmit, reorder, or completely drop egress traffic previously published by the failed primary VM.

In another aspect, the invention schedules a checkpoint to occur after candidate egress frame(s) have bypassed the buffering stage and been published to the network. In doing so, the delay prior to the completion of a future checkpoint represents and limits the roll-back effects. In a checkpoint computer system, egress network frames are buffered until they can be released to the network through the completion of a checkpoint commitment. This results in additional latency in delivering egress frames to the network. For many types of network applications this added latency, which may be significant, is hidden from the end-user experience. For instance, a streaming transfer of file data using TCP can effectively hide additional latency through the use of TCP Window Scaling techniques. Many applications, however, cannot hide this additional latency, and a subset of these applications perform poorly. Examples of this subset include video streaming for the purpose of real-time visual effects; security related video monitoring; media servers; and sign messaging controllers. In each of these examples, additional latency can affect the end-user experience to where a checkpoint solution is unacceptable.

Increasing the checkpoint rate typically reduces network egress latency, but the overhead cost of rapid checkpoints can be equally detrimental. A more targeted approach, albeit limited in scope, is to provide a mechanism for selectively bypassing egress buffering for certain types of applications. This class of application must be tolerant of roll-back behavior in which candidate network frames may be lost, retransmitted, reordered, and potentially contain different content. In the examples cited, general video or multi-media egress traffic could tolerate a roll-back while benefiting greatly in reduced latency and checkpoint load.

Referring to FIG. 1, components of a checkpoint engine 122 with a virtual machine 100 are shown. The virtual machine 100 would typically be connected to a second virtual machine (not shown) to achieve a fault tolerant computing system. The virtual machine 100 includes a checkpoint module 101. The checkpoint module 101 buffers egress network data 109 in an input/output module (I/O) 110, and a notification event 112 may also alert the checkpoint engine 122. Alternatively, in the case of the present invention, selection logic 118 running in the checkpoint module 101 identifies an egress network frame (a network traffic packet) as a bypass candidate and allows it to pass (115) through the input/output module 110, making its way directly to the network interface 120. More specifically, a candidate egress frame is detected by the selection logic examining information in a packet header, and if it determines that the packet is a candidate packet, the system passes this through directly to the network interface and no immediate checkpoint operation is necessary. Among other things, the selection logic can examine destination network address information, destination port number information, source network address information, and network interface identity information in a packet header to determine whether a packet is a candidate packet. In some embodiments, a subsequent checkpoint cycle can be scheduled to limit the roll-back exposure, thus limiting the visual effects of an application as it handles the transition from primary to secondary VM control.

Continuing to refer to FIG. 1, storage data (referred to generically as block-IO) is allowed to move 119 more freely between input/output module (I/O) 110 and the block interface 114. When the checkpoint engine 122 is idle, normal network egress data (if any) remains in a buffered state by input/output module (I/O) 110, and will only be released by signal 113 to input/output module (I/O) 110 after the next checkpoint reaches its commit/release stage. At that time, network data (if any) is transferred 134 from the input/output module (I/O) 110 to the network interface 120. When a checkpoint is declared, the virtual machine 100 is paused and the dirty page data (VM state) 116 is processed by the checkpoint engine 122. In the case of the present invention, this checkpoint has no effect on frames allowed to bypass the buffering stage of 110 earlier, except to limit the roll-back exposure.

In more detail and referring to FIG. 2(a), a timing diagram of events and methods occurring in sequence for a primary virtual machine is shown for a checkpoint system known to the prior art. The primary virtual machine is either running (executing the application) 210, 210' or paused 214. The checkpoint engine includes additional timing conditions as shown in FIG. 2(b). The checkpoint engine may be idle 220 until a checkpoint (P) occurs 224 at which time the checkpoint engine causes 226 the primary virtual machine to pause 214. While the primary virtual machine is paused 214, the state of the primary virtual machine is captured 228 by the checkpoint engine. Capture is a page-copying stage that allows the virtual machine to be resumed and executed in parallel with checkpoint 'transfer' 236 and 'ACK-wait' 240.

In another embodiment, page-copying is avoided all together and pages are just transferred as they are. In this case, the guest remains paused during the transfer 236 and ACK-wait 240 stages. Combinations of these two approaches may also be used. Once the state data is captured 228, the checkpoint engine resumes 232 the primary virtual machine which again executes 210' the application.

The captured state data is then transferred 236 to the secondary virtual machine. Once the data has been transferred, the checkpoint engine waits for an acknowledgement (ACK) to be received 240 from the secondary virtual machine, indicating that the data has been received. At this point, the checkpoint cycle is committed and the buffered network data released 244 to the network. At this point the checkpoint engine enters an idle state 220' until the next checkpoint 224' occurs.

Referring to FIG. 3(a), the timing of the virtual machine is shown for a checkpoint system according to the present invention. In this embodiment, the primary virtual machine is either running (executing one or more applications) 310, 310' or paused 314. The checkpoint engine operates under the timing conditions as shown in FIG. 3(b). A number of checkpoint engine timing transitions are the same as shown in FIG. 2(b). For example, the checkpoint engine may be idle 320 until a checkpoint (P) occurs 324, at which time the checkpoint engine causes 326 the primary virtual machine to pause 314. While the primary virtual machine is paused 314, the state of the primary virtual machine is captured 328 by the checkpoint engine. Once the state data is captured 328, the checkpoint engine resumes 332 the primary virtual machine which again executes 310' one or more applications.

The captured state data is then transferred 336 to the secondary virtual machine. Once the data has been transferred, the checkpoint engine waits for an acknowledgement (ACK) 340 to be received from the secondary virtual machine, indicating that the data has been received. At this point, the checkpoint data is committed 344, which includes releasing one or more network frames held in the egress buffer.

The checkpoint engine then enters an idle state 348 but in this embodiment, the idle state includes actively inspecting newly generated egress network frames from the guest to identify candidate frames. If candidate frame(s) is identified, it is allowed to be released to the external network without buffering and while the checkpoint engine remains in the idle state 348. This reduces the latency of candidate frames, and may also reduce the need for rapid checkpoint overhead.

The inspection of egress frames is an activity which may be performed independent of the checkpoint engine itself, allowing candidate frames to pass through or around the normal egress buffering any time the primary VM issues them. The method for determining the existence of a candidate frame should be applied easily and quickly, without the need to track the history of a connection/session. In this sense, the test for a candidate frame is stateless with regard to the ongoing dialogue between the primary virtual machine and other computers on the network.

Additionally, the scheduling delay of a related (follow-up) checkpoint can vary according to disposition of the prior candidate frame(s). For instance, candidate frames destined for specific port numbers (e.g., 100, 200) would require no follow-on checkpoint while other candidate frames destined to specific ports (e.g., 300) would benefit by a checkpoint commitment in the near future (e.g., 10 milliseconds). The benefit of a follow-on checkpoint is to limit or reduce the roll-back effects on protocols and applications.

In another embodiment, the virtual machine has multiple network interfaces. The network traffic on a specific network interface may be of a nature such that all of its packets are candidates for egress buffer bypass. It is also possible that a specific network interface only carries candidate packets.

An example of a network interface that carries only candidate packets would be a system designed to use the interface for delivering nothing except network messages to control devices. These devices are able to handle the possibility of a roll-back to an earlier moment, including where some prior received messages are received again and may not contain the same information. A further example might be a system that sends time stamped text messages for display.

Unless specifically stated otherwise as apparent from the following discussion, it is appreciated that throughout the description, discussions utilizing terms such as "processing" or "computing" or "calculating" or "delaying" or "comparing", "generating" or "determining" or "deferring" or "committing" or "checkpointing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will be understood from the description above. In addition, the present invention is not described with reference to any particular programming language, and various embodiments may thus be implemented using a variety of programming languages.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A method of network traffic transmission control in a fault tolerant, checkpoint computer system, the method comprising:

identifying a first type of network traffic transmitted to a first destination application that is tolerant of a checkpoint rollback operation, and identifying a second type of network traffic transmitted to a second destination application that is not tolerant of a checkpoint rollback operation;

configuring the fault tolerant, checkpoint computer system to detect the first and the second types of network traffic;

generating by the fault tolerant, checkpoint computer system a first packet of information comprising the first type of network traffic and a second packet of information comprising the second type of network traffic; and detecting and buffering the second packet of information, and detecting and immediately transmitting the first packet of information over a network to the first destination application.

2. The method of claim 1, further comprising determining that the first type of network traffic is candidate network traffic by examining header information in the packet of the first type of network traffic generated by the fault tolerant, checkpoint computer system.

3. The method of claim 2, wherein the packet header information examined is any one or more of a destination network address, a destination port number, a source network address, a source port number, and a network interface identity.

4. The method of claim 1, further comprising the immediate transmitting of the first packet is followed by a delayed checkpoint operation.

5. The method of claim 1, wherein the first or the second network traffic comprises a packet of information transmitted by the fault tolerant, checkpoint computer system over the network to either a first or a second one of the destination applications.

6. The method of claim 1, wherein the first and the second destination applications run on a network device that is remote to the fault tolerant, checkpoint computer system or the first and the second destination applications run on a virtual machine associated with the fault tolerant, checkpoint computer system.

7. A method of network traffic transmission control in a fault tolerant, checkpoint computer system, the method comprising:
    identifying a candidate network traffic type as network traffic transmitted to a destination application that is tolerant of a checkpoint rollback operation;
    configuring the fault tolerant, checkpoint computer system to detect the candidate type of network traffic;
    generating and detecting by the fault tolerant, checkpoint computer system a packet of information comprising the candidate network traffic type; and
    immediately transmitting the packet of information to the destination application.

8. The method of claim 7, further comprising determining that the immediately transmitted packet is candidate network traffic by examining header information in the packet.

9. The method of claim 8, wherein the packet header information examined is any one or more of a destination network address, a destination port number, a source network address, a source port number, and a network interface identity.

10. The method of claim 7, further comprising the immediate transmitting of the packet of information is followed by a delayed checkpoint operation.

11. The method of claim 7, wherein the candidate network traffic comprises a packet of information transmitted by the fault tolerant, checkpoint computer system over the network to the first destination application.

12. The method of claim 7, wherein the destination application runs on a network device that is remote to the fault tolerant, checkpoint computer system or runs on a virtual machine associated with the fault tolerant, checkpoint computer system.

13. A fault tolerant, checkpoint computer system, comprising:
    a virtual machine;
    an input-output buffer that is configured to detect network traffic transmitted to a destination application that is tolerant of a checkpoint rollback operation; and a network interface;
    wherein the network interface operates to detect a packet of information generated by the virtual machine, the packet of information comprising candidate network traffic transmitted to the destination application which is tolerant of a rollback checkpoint operation and the candidate network traffic is identified by examining the header information in the packet of information and the network interface immediately transmitting the packet of information to the first destination application.

14. The method of claim 13, wherein the packet header information examined is any one or more of a destination network address, a destination port number, a source network address, a source port number, and a network interface identity.

15. The method of claim 13, further comprising the immediate transmitting of the packet of information is followed by a delayed checkpoint operation.

* * * * *